(No Model.)
W. R. McDONALD.
UMBRELLA HOLDER FOR BICYCLES.
No. 558,296. Patented Apr. 14, 1896.
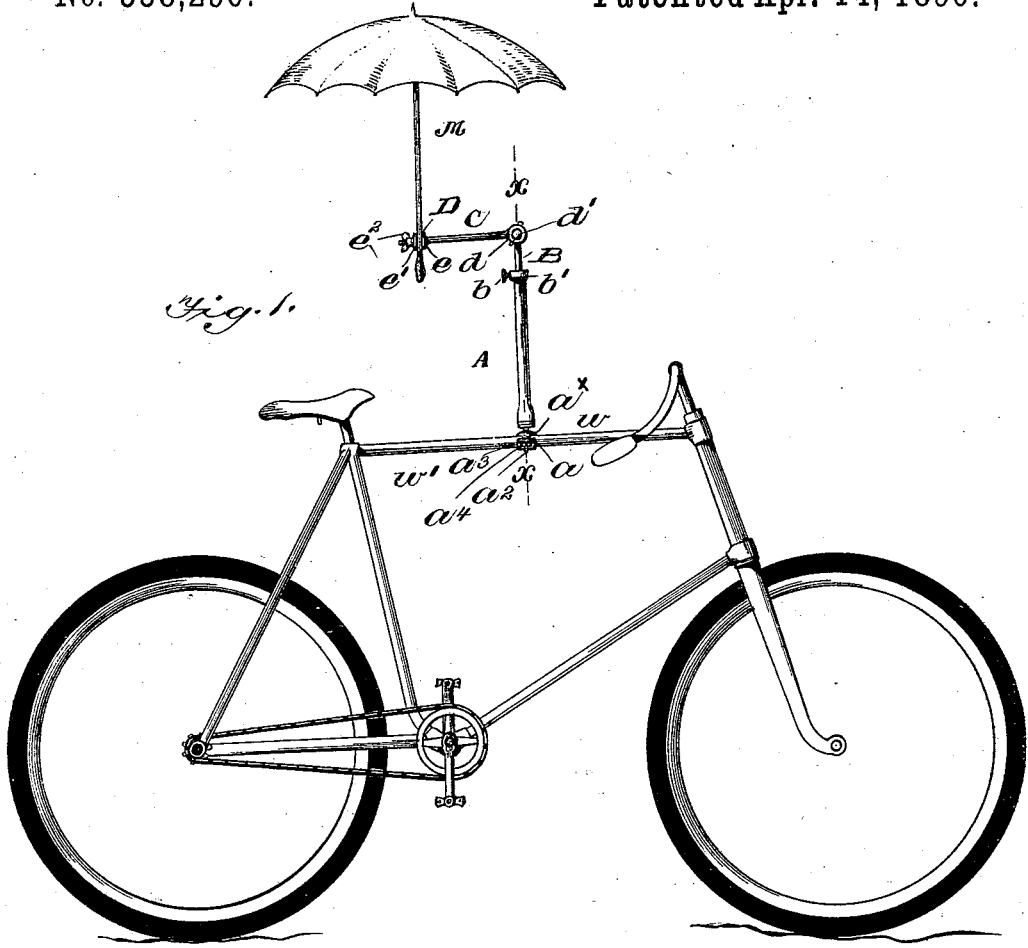
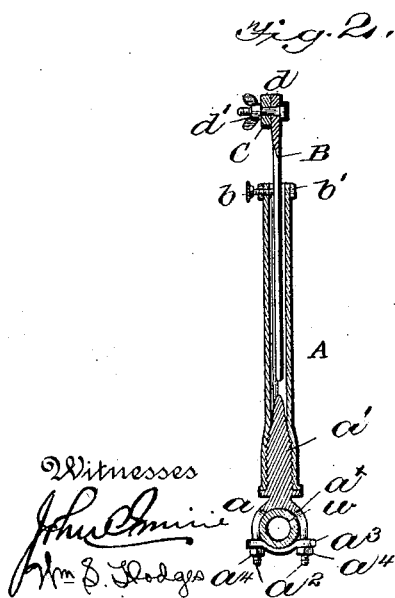
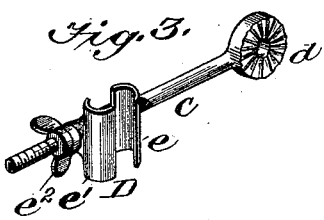
Witnesses
Inventor
Wm. R. McDonald
by Allan Rutherford
Attorney

UNITED STATES PATENT OFFICE.

WILLIAM R. McDONALD, OF MEMPHIS, TENNESSEE, ASSIGNOR OF ONE-HALF TO R. KUPPERSCHMIDT, OF SAME PLACE.

UMBRELLA-HOLDER FOR BICYCLES.

SPECIFICATION forming part of Letters Patent No. 558,296, dated April 14, 1896.

Application filed October 22, 1895. Serial No. 566,521. (No model.)

*To all whom it may concern:*

Be it known that I, WILLIAM R. McDONALD, a citizen of the United States of America, residing at Memphis, in the county of Shelby and State of Tennessee, have invented certain new and useful Improvements in Umbrella-Holders for Bicycles, of which the following is a specification, reference being had therein to the accompanying drawings.

This invention contemplates certain new and useful improvements in umbrella-holders for bicycles and the like, and has for its object the production of an exceedingly simple and inexpensive device of this character capable of being readily attached to a bicycle-frame, and by means of which an umbrella can be held at any desired angle or position without interfering with the rider.

The invention will be hereinafter fully set forth, and particularly pointed out in the claims.

In the accompanying drawings, Figure 1 is a view in side elevation showing a bicycle in general outline provided with my improvements. Fig. 2 is an enlarged vertical sectional view on the line $x\,x$, Fig. 1. Figs. 3 and 4 represent details.

Referring to the drawings, A designates a holder or support, which is of tubular form and adjustably secured to one of the bars $w$ of the bicycle-frame $w'$. This holder is attached to said bar by a clamp $a$, having an upper enlarged threaded portion $a'$, which engages a lower interiorly-threaded portion of said holder. From the clamp extend two lateral wings $a^2$, the inner surfaces of which form a concavity corresponding to the contour of bar $w$, and from said wings extend threaded portions $a^3$, which are designed to extend through holes of a plate or member $a^4$, having an upper concavity to conform to said bar $w$, and nuts $a^5$ screwed on said threaded portions enable the clamp to be firmly attached to said bar.

B is a rod adjustably mounted within holder A and held at any desired point by a screw $b$, working in a threaded hole or opening in said holder, and a collar $b'$ thereon. To the upper end of this adjustable rod B is articulated an arm C, the union between said arm C and the adjustable rod B being effected by two circular serrated or toothed plates $d$, adjustably united by a thumb-screw $d'$, passed through coincident holes or openings in the centers thereof. By this means the arm C can be adjusted and firmly secured at any desired angle relative to the rod B. To this arm C, at or near the outer end thereof, an umbrella M is designed to be attached by means of a clamp D. This clamp consists of two parts or members $e\,e'$, extending laterally from said arm, the part or member $e$ being stationary, while the other part or member is adjustable and capable of being held at any desired point by a nut $e^2$, which works on the threaded end of said arm. The two parts or members of the umbrella-clamp are of concavo-convex form, so as to firmly grasp the umbrella-stick. By means of the thumb-nut the clamp can be tightened or loosened at will.

From what has been said it will be seen that I have provided an extremely simple and inexpensive holder or support for an umbrella for bicycles. The support or holder can be firmly attached to the bicycle-frame at any desired point along the frame-bar, and the jointed rod or arm can be turned and held at any desired angle, according to the position it is desired the umbrella should hold.

I claim as my invention—

1. The combination with a bicycle-frame, of a clamp having an upper conical threaded portion, a tubular holder or support adjustably secured on the conical portion of said clamp, a rod longitudinally adjustable within said holder or support, an arm adjustably connected to said rod, and a clamp on said arm for an umbrella-stick, substantially as set forth.

2. The combination with a bicycle-frame, of a clamp attached thereto having an upper conical threaded portion, a cylindrical or tubular holder or support having a lower enlarged threaded portion engaging the threaded portion of said clamp, a thumb-screw working in the upper end of said holder or support, a rod adjustably mounted in said holder or support and designed to be held by said screw, an arm articulated to said rod, means for adjusting and holding the latter together, a two-part clamp on the outer end of said arm, and means for binding the same, substantially as set forth.

3. The combination with a bicycle-frame, of a clamp adjustably mounted thereon and having an upper conical threaded portion, a holder or support of cylindrical or tubular form having a lower enlarged threaded portion engaging the conical portion of said clamp, a screw in the upper end of said holder or support, a rod adjustably mounted in said holder or support, and designed to be held by said screw, said rod having an upper circular serrated portion, an arm having a correspondingly-serrated circular portion, a screw for holding said serrated portions, a two-part clamp on the outer end of said arm, and a nut for binding said clamp, substantially as set forth.

In testimony whereof I affix my signature in presence of two witnesses.

WILLIAM R. McDONALD.

Witnesses:
ADOLPH HANDWERKER,
PAUL KAISER.